Figure 7:
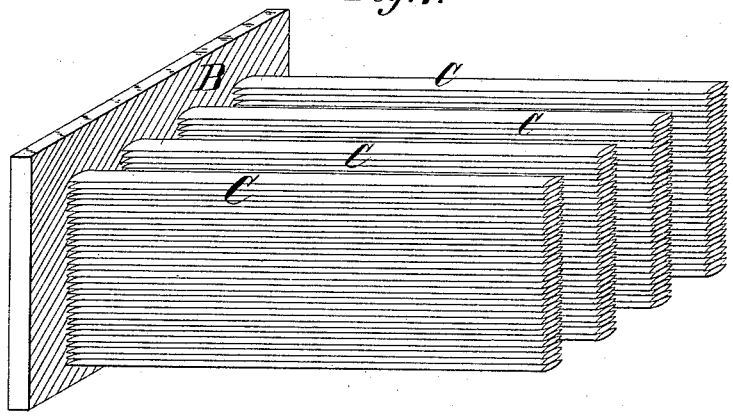

(No Model.) 2 Sheets—Sheet 1.
E. JONES.
SECONDARY BATTERY.
No. 331,407. Patented Dec. 1, 1885.
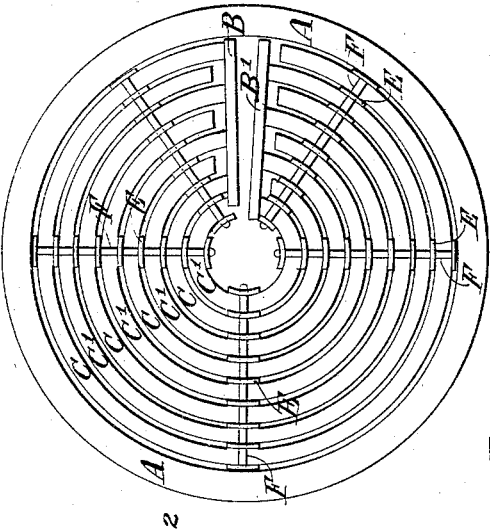
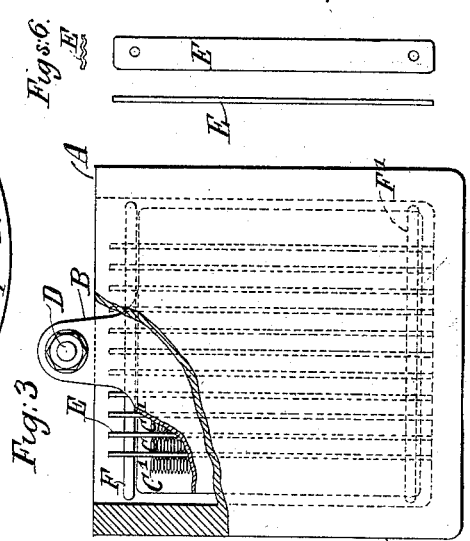
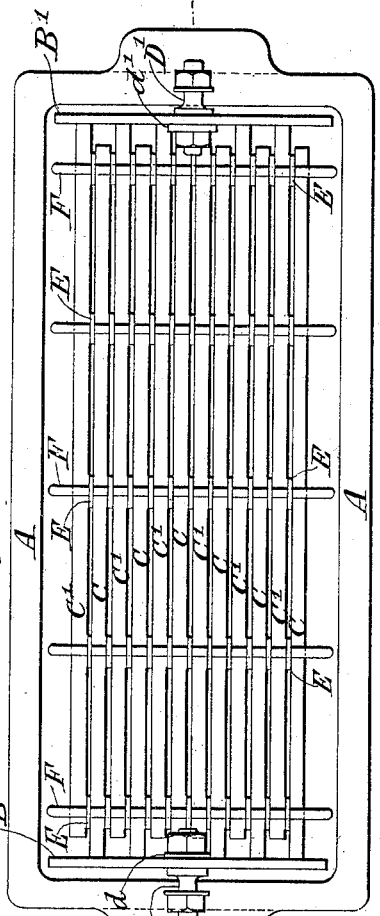
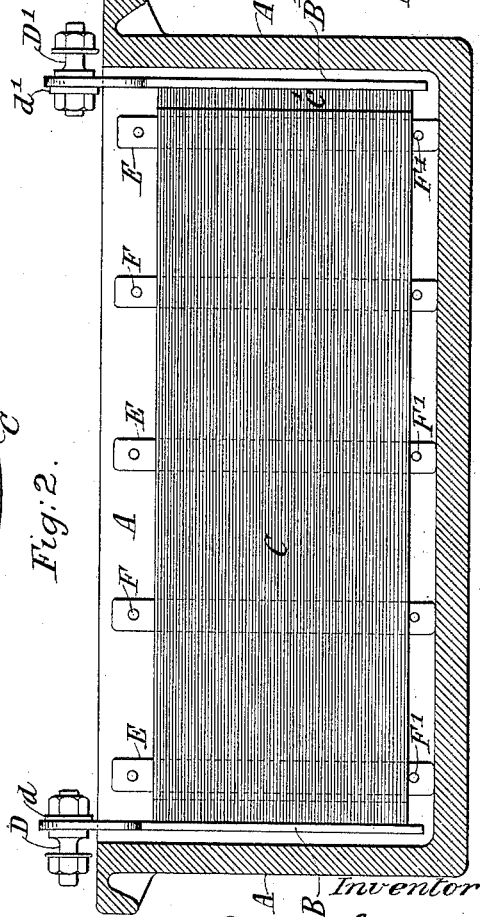
Witnesses:
Matthew Pollock
C. L. Sundgren
Inventor:
Edward Jones
By his Attys.
Brown & Hall (No Model.) 2 Sheets—Sheet 2.
E. JONES.
SECONDARY BATTERY.

No. 331,407. Patented Dec. 1, 1885.

UNITED STATES PATENT OFFICE.

EDWARD JONES, OF LEEDS, COUNTY OF YORK, ENGLAND.

SECONDARY BATTERY.

SPECIFICATION forming part of Letters Patent No. 331,407, dated December 1, 1885.

Application filed December 4, 1884. Serial No. 149,470. (No model.) Patented in England April 7, 1884, No. 6,068; in France October 3, 1884, No. 164,602; in Germany October 5, 1884, No. 32,987; in Italy November 30, 1884, No. 17,485, and in Austria January 23, 1885, No. 37,563.

*To all whom it may concern:*

Be it known that I, EDWARD JONES, of Westhill Terrace, Chapel Allerton, Leeds, in the county of York, England, mechanical engineer, have invented certain new and useful Improvements in Secondary Batteries, (for which I have obtained Letters Patent of Great Britain, No. 6,068, dated April 7, 1884, a Brévét d' Invention of France, No. 164,602, dated October 3, 1884, a German patent, No. 32,987, dated October 5, 1884, an Italian patent, No. 17,485, dated November 30, 1884, and an Austrian patent, No. 37,563, dated January 23, 1885,) of which the following is a specification.

The object of this invention is to construct a simple and efficient secondary or storage battery. Various attempts have been made to attain this result. In some cases finely-divided lead has been packed in reticulated plates of metallic lead, while in others it has been proposed to cast a support or frame-work of lead around studs, prisms, or cones formed of finely-divided lead compressed to the desired shape. One defect common to such batteries is due to the difficulty of effecting a perfect union between the so-called "active material" (finely-divided or spongy lead) and the material (lead or lead alloy) of which the supporting-plates are formed, as, unless a perfect union is effected, the acid gradually gets between the plugs or pieces of spongy or finely-divided lead and their supports, the plugs or prisms work loose and fall to the bottom of the battery, and great inconvenience and loss of efficiency result. It has been proposed to remedy this defect by casting the lead or lead alloy around the bases of the studs or prisms of spongy or finely-divided lead; but no practical means has been hitherto devised for carrying this into effect. Now, in constructing secondary batteries according to my invention, I dispense entirely with the use of spongy or finely-divided lead, or lead previously "formed" or provided with an active coating in the construction of the electrodes prior to "forming" the battery, and I construct my electrodes of metallic lead or lead alloy, in the manner hereinafter described.

In my improved secondary battery each electrode in a pair is a counterpart of the other, and each is formed throughout of metallic lead or lead alloy, so disposed as to present a very large extent of surface to the action of the exciting-fluid in the battery. I obtain this large surface by constructing each electrode with a number of strips, ribbons, or wires of easily-fusible metal—such as metallic lead—arranged in rows, and integrally united at one end only with a base or plate of similar material, and preferably at right angles thereto. The two electrodes for every pair have their projecting strips, ribbons, or wires so arranged that when in their proper relative position in the cell the said bases or plates will be opposite and substantially parallel, the one to the other, and the rows of strips, ribbons, or wires projecting from one plate or base will interlock or alternate with those on the other plate or base, and will leave room for the insertion between the said several rows of insulating-plates of glass or other suitable material. The strips, ribbons, or wires being united with their respective base or plate at one end only, those of each row may thus rest one upon another in such manner as to be free to move in vertical planes without buckling or being so distorted as to involve danger of short-circuiting the battery.

In the accompanying drawings, Figure 1 is a plan view of a complete cell constructed according to my invention. Fig. 2 is a longitudinal section on the line 1 2 of Fig. 1; and Fig. 3 is an end view of the cell, partly in section. Fig. 4 is a plan of a pair of interlocking electrodes constructed according to my invention, but having their projecting strips arranged in concentric circles or curves. Fig. 5 is a section, on an enlarged scale, of one of the strips forming part of an electrode. Figs. 6 illustrate a corrugated insulating-strip. Fig. 7 is a perspective view of one of the electrodes.

A is the jar or cell which forms the receptacle for the electrodes and the exciting-liquid, and which is of porcelain or other suitable acid-proof material.

B B' are the end plates of the electrodes, formed of an easily-fusible metal—such as lead—integrally united to one end of each of a number of strips, ribbons, or wires, C C'—also of lead—arranged in rows, each row somewhat resembling the teeth of a comb.

D D' are the terminals of the electrodes for connecting two or more cells together, and for connecting the cells with the charging-dynamo, or with the circuit on which they are to be used.

E E are the insulating-strips, which serve to keep the several rows of strips separate, and which may be of any insulating material—such as glass, vulcanite, or wood—suitably prepared to resist the action of the electrolyte, which preparation of the wood may be conveniently effected by boiling the wood in paraffine-wax.

F F' are rods or bars, also of insulating material, which pass through holes in the insulating-strips E E, and keep them in place. The lower rods or bars, F', form supports for the lead strips of the electrodes to rest upon, and keep the said electrodes clear of the bottom of the cell A, thereby obviating all risk of short-circuiting the electrodes by means of any foreign matter which may get into the cell and be deposited on the bottom.

The strips E E and rods or bars F F' constitute an insulating and supporting frame, by which the pair of electrodes are held in their proper relative positions, and by temporarily connecting the upper bars, F, to a rod or common support the pair of electrodes can be readily lifted in or out of the cell.

The form in which I prefer to use the strips C C' is illustrated in cross-section in Fig. 5 on an enlarged scale, and is that of a lozenge or elongated diamond. I prefer this form, because it exposes a large surface to the exciting-liquid, while leaving intact a sufficient center or core of metal to render the conductivity exceedingly good, because strips of this form will pack closely, and, while free to move vertically without buckling, are not liable to crumble at their edges, and because they are well adapted to promote the unimpeded circulation of the exciting-liquid and the free escape of the evolved gases. I prefer to form the lead strips of this section in a machine by expressing, "drawing," or "squirting" the lead under hydraulic pressure, the strip being straightened by means of roughened drawing-rollers, which will grip it firmly, and it is then cut up into lengths. I prefer to arrange these strips in rows, with their narrower axes in line and touching, the rows of strips C in one electrode alternating or interlocking with the rows of strips C' in the other electrode, and to insulate the several rows from one another by strips of wood suitably treated to resist the attack of the acid, or by strips of other suitable insulating material—such as glass—which may be plain or corrugated, as shown in Fig. 6, and be pierced with holes to allow of the insertion of the connecting-rods F F', also of insulating material. The strips C C' might be arranged side by side in horizontal rows, instead of resting the one on the other in vertical rows, or they might be curved so as to interlock concentrically, as shown in Fig. 4; but the arrangement shown in Figs. 1, 2, and 3 is that which I prefer. By this construction and arrangement of the electrodes all chance of the plates or elements bulging in a direction which will cause them to touch each other is obviated, while the strips in each row are free to rise and fall as the lead expands or contracts. Moreover, each strip being integrally united to a supporting plate or base of similar material to itself, an unbroken metallic conduction in each electrode is secured, which greatly promotes the efficiency of the battery.

The terminal bolts D are preferably made of tinned iron, and the conductors, which connect together the terminals of the electrodes in a battery of several cells, may be of copper, tin, or other metal.

d d' are washers which prevent the nuts from cutting into the lead when the terminals D are clamped to their respective electrodes.

I do not confine myself to any method of uniting the rows of strips, ribbons, or wires to their respective bases or plates; but the method which I prefer and have adopted is that which is the subject of my application for United States Letters Patent, Serial No. 173,195, filed July 31, 1885.

It will be obvious that interlocking electrodes for secondary batteries may be constructed in the manner above described from other metals than lead or from alloys, and I do not therefore limit my invention to electrodes of lead, though I prefer to employ that metal; and, also, that the metal strips may be arranged in concentric curves or circles as well as in straight lines.

Having now particularly described my said invention and in what manner the same is to be performed, what I desire to claim is—

1. A metal electrode for secondary batteries, consisting of strips or wires integrally united at one end only to a common supporting plate or base and extending therefrom in comb-like rows, the independent strips or wires in each row lying closely together, clear spaces being left between the several rows of strips in each electrode for the reception of the rows of strips of another electrode similarly constructed.

2. A secondary battery fitted with interlocking electrodes, each consisting of a series of comb-like rows of strips or wires of metal integrally united at one end only to a common supporting plate or base, in combination with a frame or rack, such as E E F F', whereby the electrodes are securely held in proper relative position and insulated, substantially as and for the purpose set forth.

3. In a secondary battery, the combination, with a solid metal supporting-plate, as B, of the ribbons or strips C, of similar material to the plate, the said strips being arranged in parallel or concentric rows, with intervals between the rows, each row comprising a number of separate strips resting on or against one another, each strip being integrally connected by one end only to its base or support, and the strips in each row being free to move for the purpose of avoiding risk of short-circuiting the battery, substantially as herein set forth.

EDWARD JONES.

Witnesses:
    JOHN LOWE,
    EDWARD WHITELEY,
        *Solicitor's Clerks, Leeds.*